No. 867,030. PATENTED SEPT. 24, 1907.
G. GARDNER.
CAN BODY FORMING AND SOLDERING MACHINE.
APPLICATION FILED JUNE 14, 1905.
13 SHEETS—SHEET 1.
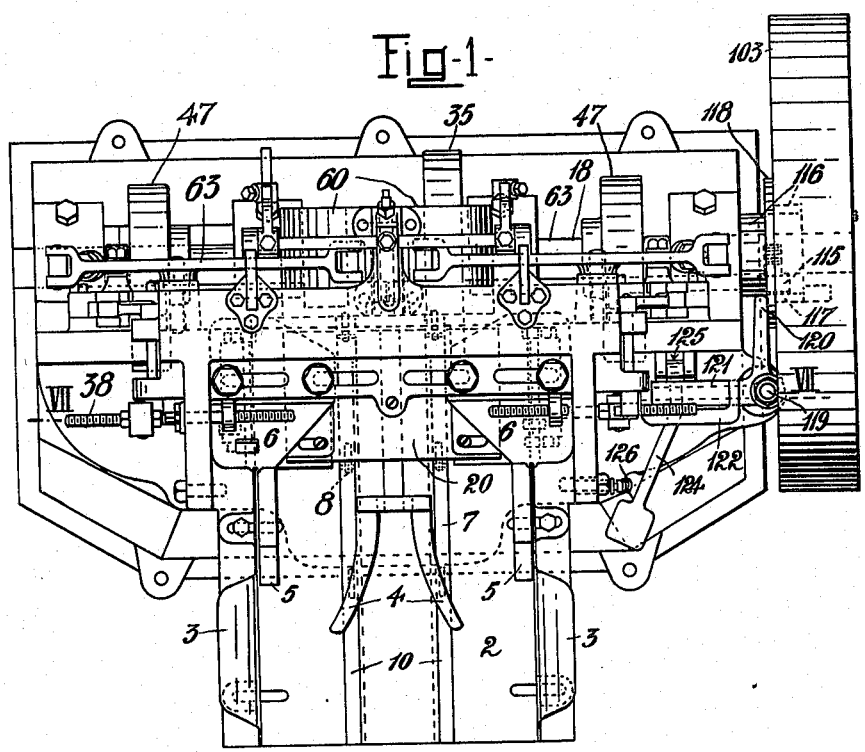
Witnesses
Walter C. Hart
William J. Harris
Inventor
George Gardner
by
Cam Walker & Son
Attorneys

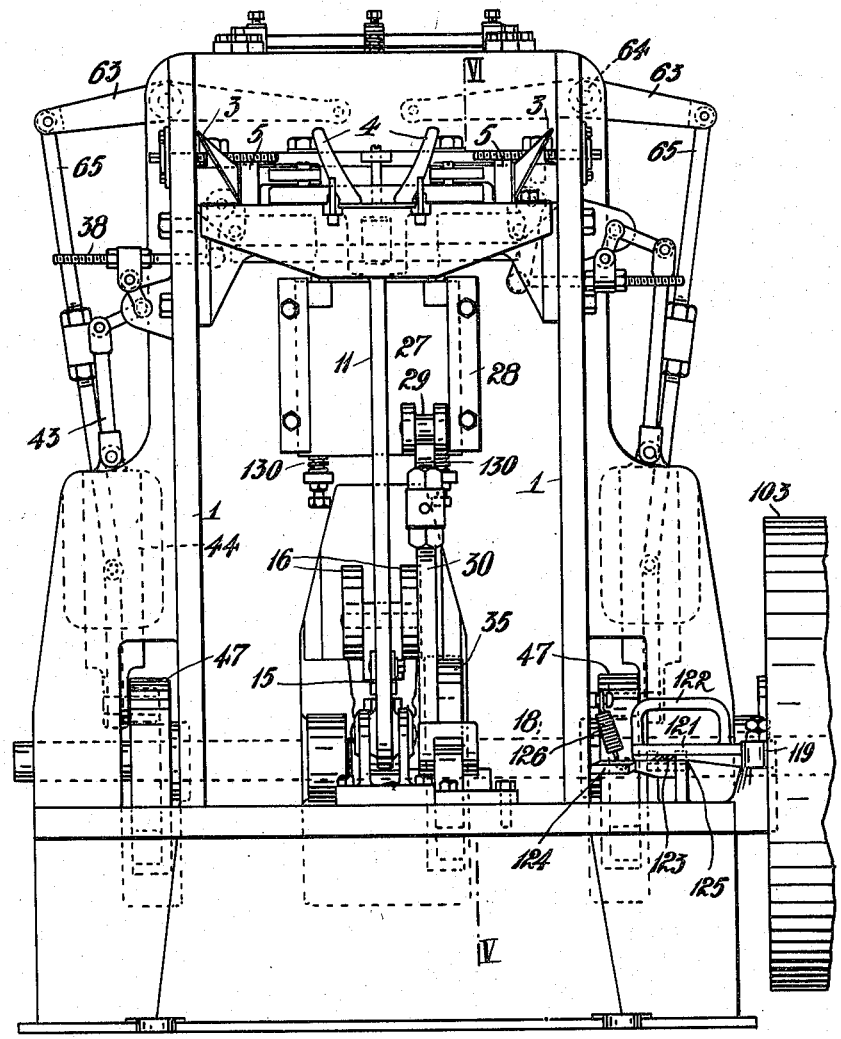

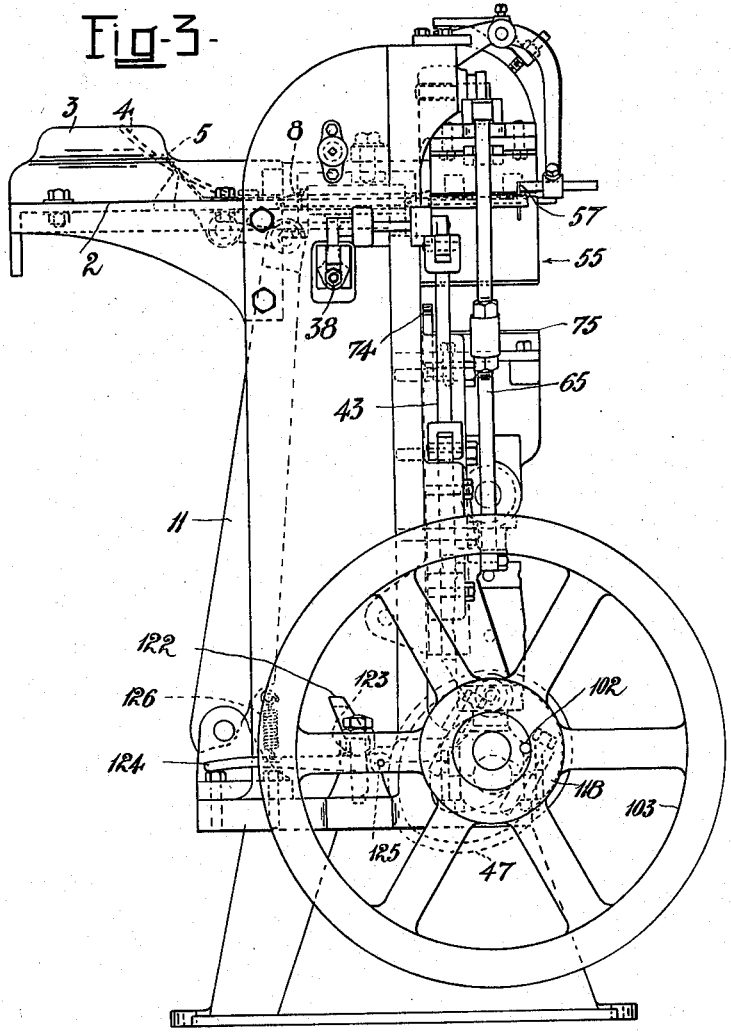

No. 867,030.                                              PATENTED SEPT. 24, 1907.
G. GARDNER.
CAN BODY FORMING AND SOLDERING MACHINE.
APPLICATION FILED JUNE 14, 1905.
13 SHEETS—SHEET 4.
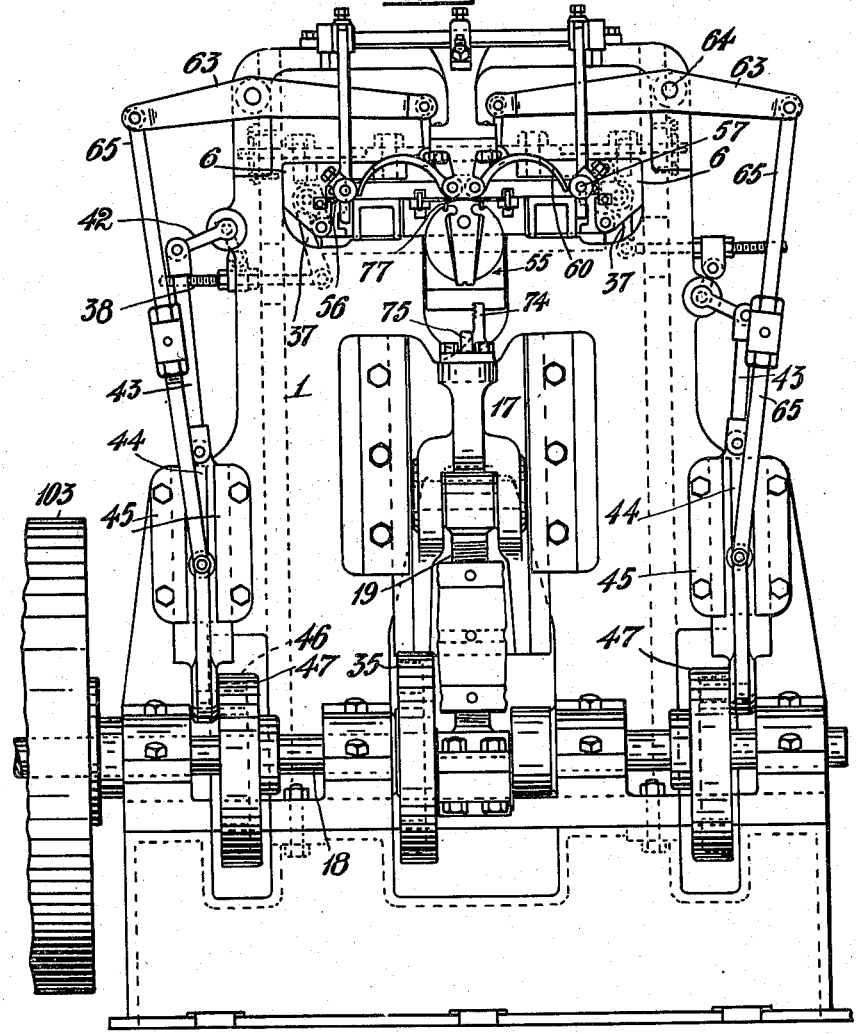

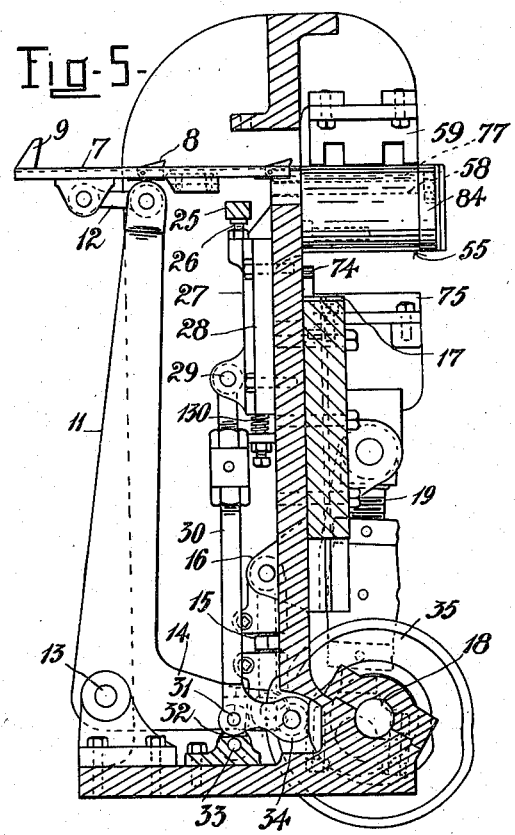

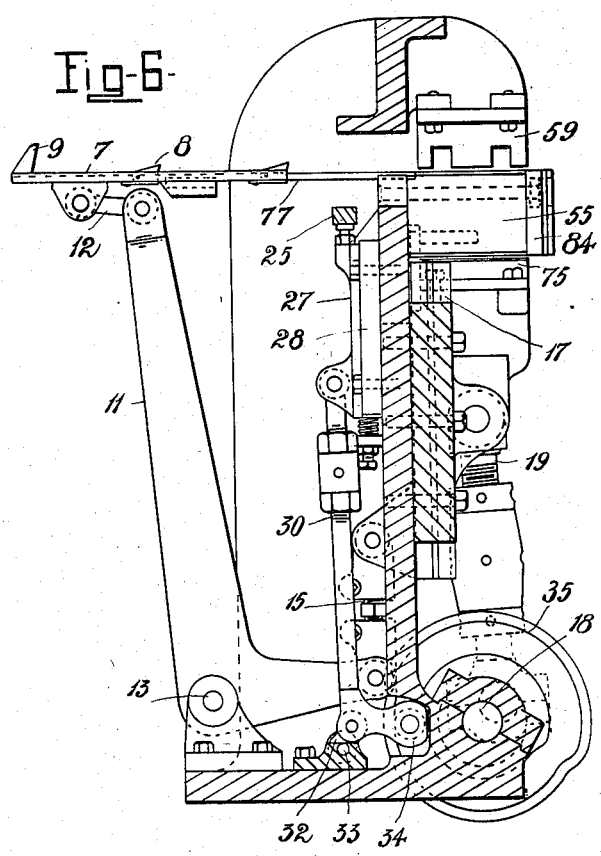

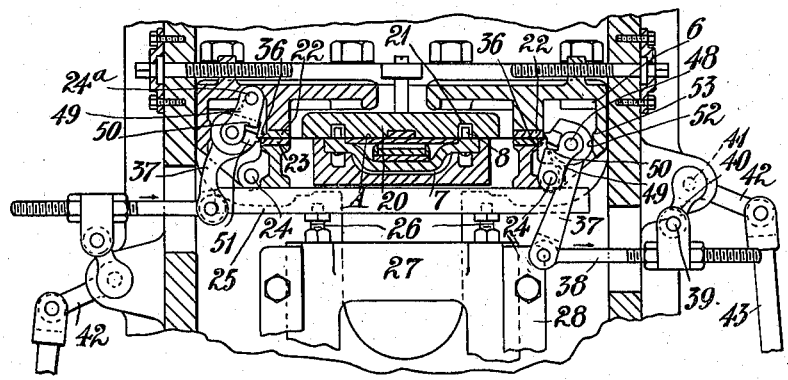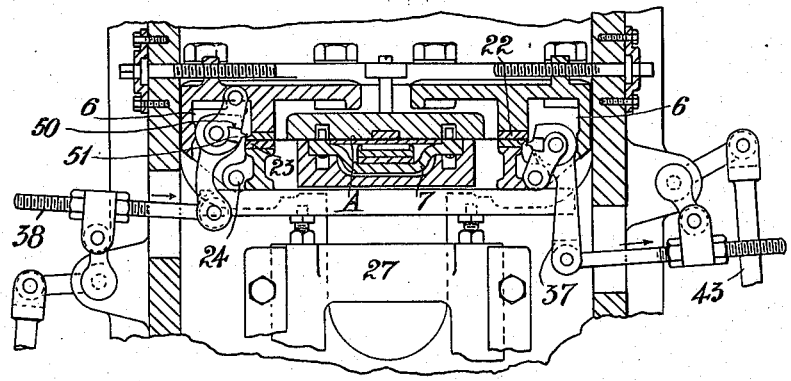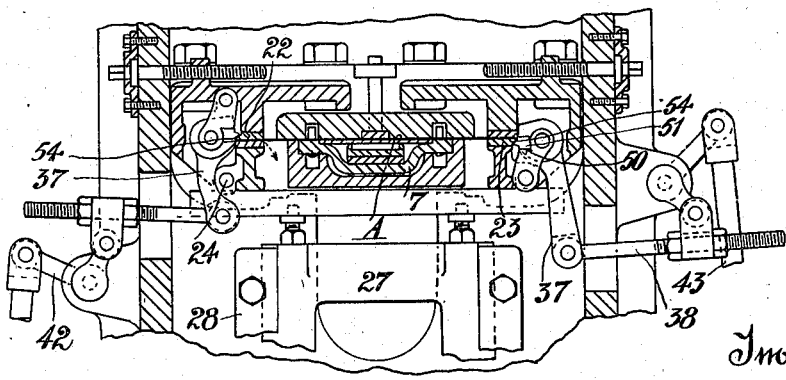

No. 867,030. PATENTED SEPT. 24, 1907.
G. GARDNER.
CAN BODY FORMING AND SOLDERING MACHINE.
APPLICATION FILED JUNE 14, 1905.
13 SHEETS—SHEET 8.
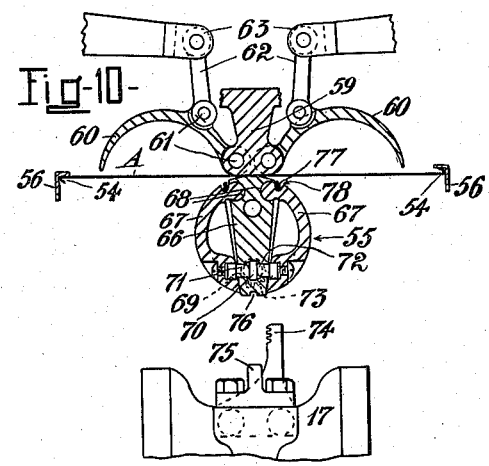
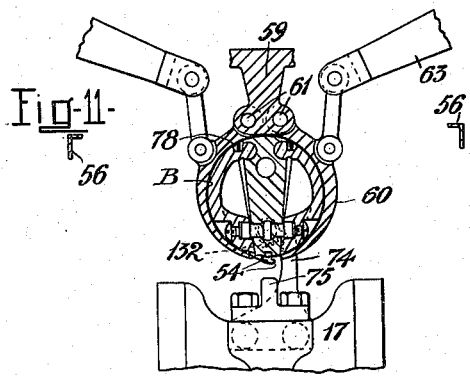
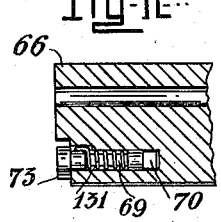
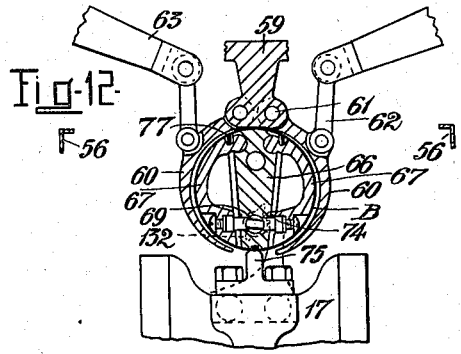
Witnesses
Walter C. Hart
William J. Harris
Inventor
George Gardner
by
Edw. Waters Voo
Attorneys

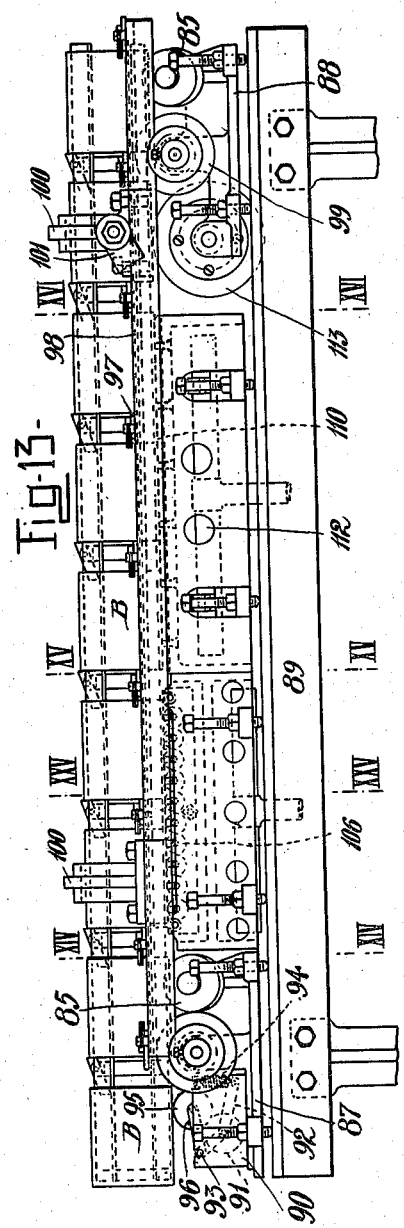

No. 867,030. PATENTED SEPT. 24, 1907.
G. GARDNER.
CAN BODY FORMING AND SOLDERING MACHINE.
APPLICATION FILED JUNE 14, 1905.
13 SHEETS—SHEET 10.
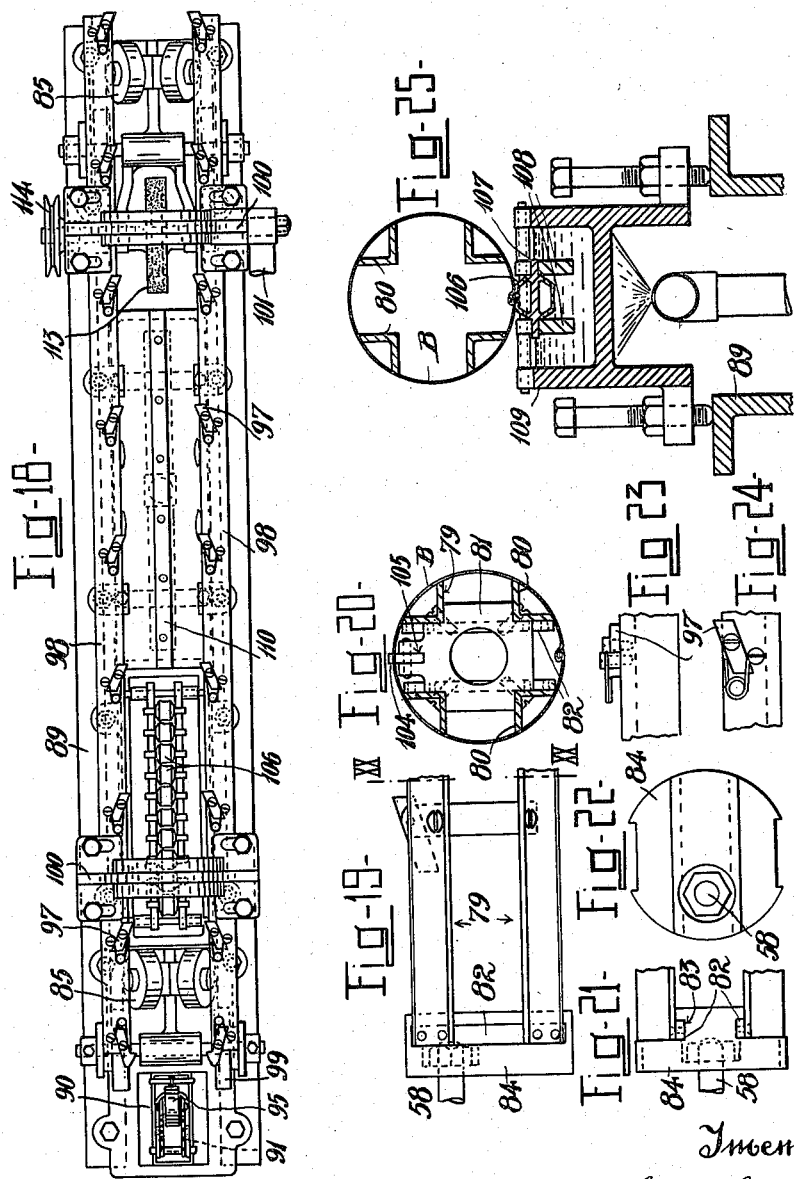

No. 867,030. PATENTED SEPT. 24, 1907.
G. GARDNER.
CAN BODY FORMING AND SOLDERING MACHINE.
APPLICATION FILED JUNE 14, 1905.
13 SHEETS—SHEET 11.
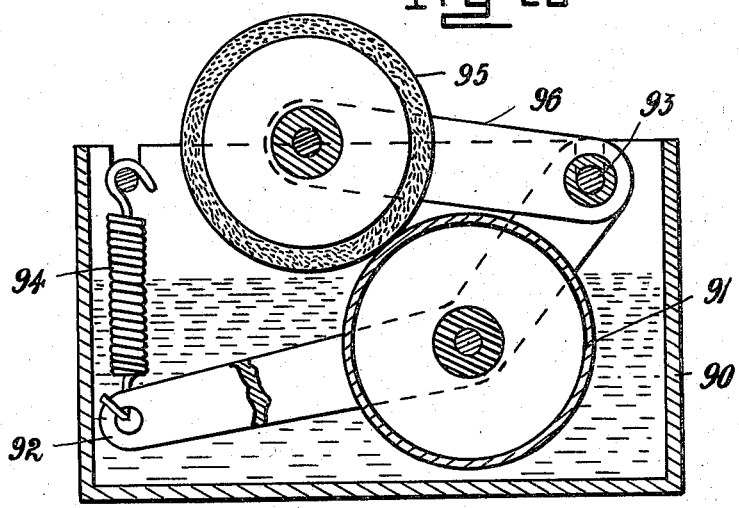
Fig-26-
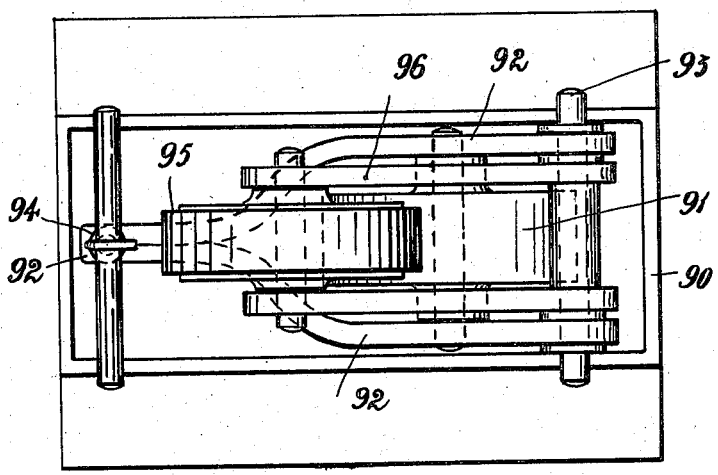
Fig-27-
Witnesses
Walter C. Hart
William J. Harris
Inventor
George Gardner
by Edw. Bakers & Son
Attorneys No. 867,030. PATENTED SEPT. 24, 1907.
G. GARDNER.
CAN BODY FORMING AND SOLDERING MACHINE.
APPLICATION FILED JUNE 14, 1905.
13 SHEETS—SHEET 12.
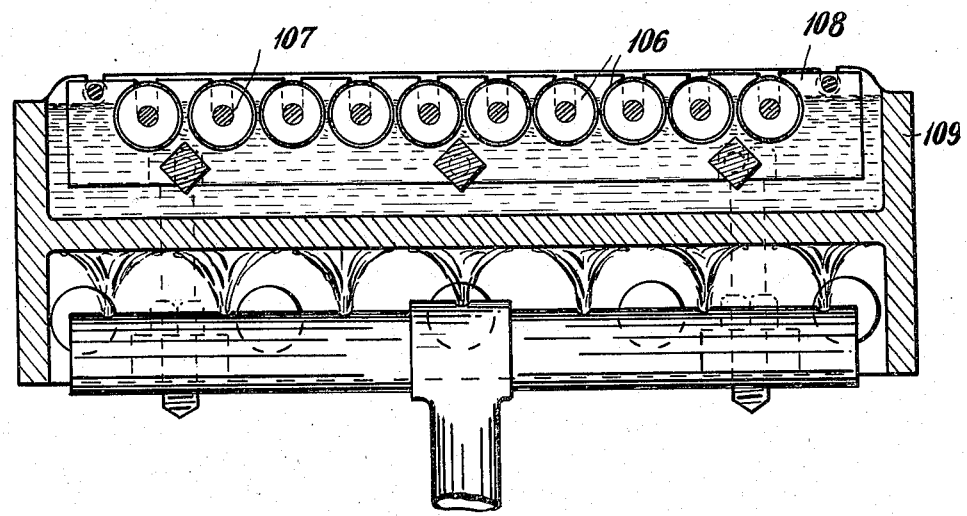
Fig-28-
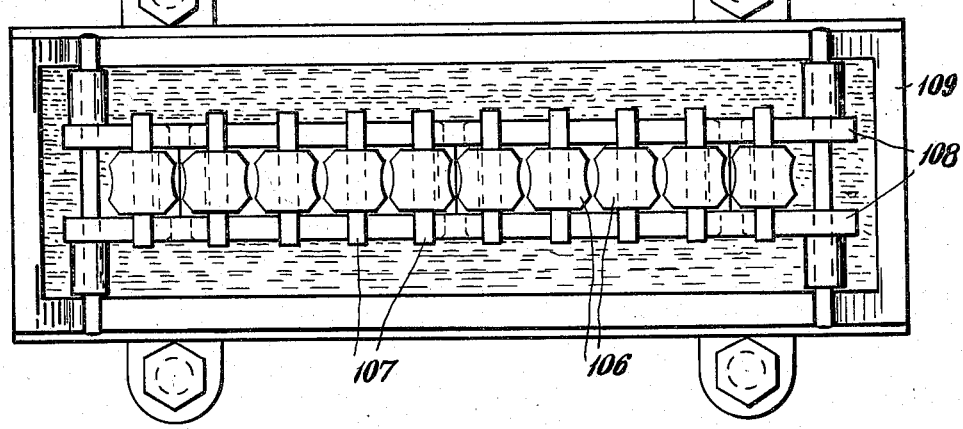
Fig-29-
Witnesses
Walter C. Hart
William J. Harris
Inventor
George Gardner
by
Baw Waters & Son.
Attorneys No. 867,030. PATENTED SEPT. 24, 1907.
G. GARDNER.
CAN BODY FORMING AND SOLDERING MACHINE.
APPLICATION FILED JUNE 14, 1905.
13 SHEETS—SHEET 13.
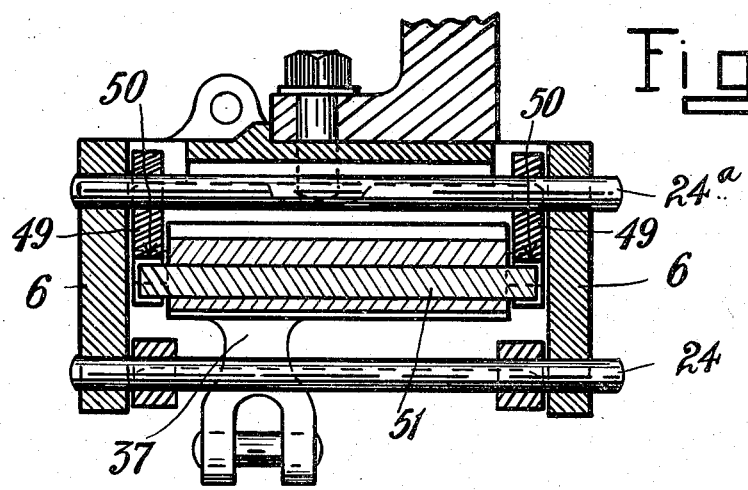
Fig-30-
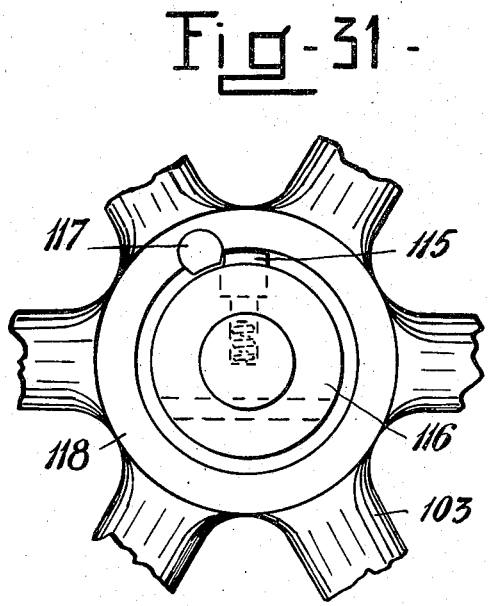
Fig-31-
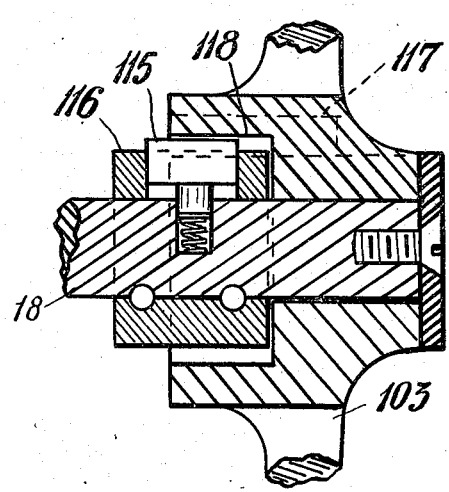
Fig-32-
Witnesses
Walter C. Hart
Percy Johnston
Inventor
George Gardner
by Edw Waters & Sons
Attorneys

UNITED STATES PATENT OFFICE.

GEORGE GARDNER, OF YARRAVILLE, VICTORIA, AUSTRALIA.

CAN-BODY FORMING AND SOLDERING MACHINE.

No. 867,030.
Specification of Letters Patent.
Patented Sept. 24, 1907.

Application filed June 14, 1905. Serial No. 265,236.

*To all whom it may concern:*

Be it known that I, GEORGE GARDNER, a subject of the King of Great Britain, residing at No. 130 Hyde street, Yarraville, in the State of Victoria, Australia, canister-maker, have invented an Improved Can-Body Forming and Soldering Machine, of which the following is a specification.

The invention relates to that class of machines in which can-bodies are formed and soldered by a continuous series of operations, from flat sheet metal blanks, and has been devised with the object of providing a more compact machine than heretofore, while at the same time facilitating the manipulation of the same without in any way interfering with its efficiency.

With machines of this class the flat metal blanks are fed in at one end, and then pass step by step through a number of successive operations, the first of which upsets the side edges of the blank in opposite directions; the second bends the blank around a horn into an approximately circular shape and insures that one side overlaps the other; the third brings the upset edges into close connection; the fourth compresses or locks same; and the fifth discharges the formed body from the horn or on to the detachable soldering apparatus employed to solder the joint after the edges have been locked.

In the accompanying drawings, which illustrate the invention, some of the figures have certain parts omitted to facilitate a ready understanding of the mechanism and its working.

Figure 1 is a plan of the machine excluding the soldering apparatus, Fig. 2 a front elevation, Fig. 3 a side elevation, and Fig. 4 a rear elevation thereof. Figs. 5 and 6 are vertical sections on line V—VI, Fig. 2, showing the movements of some of the parts. Figs. 7, 8 and 9 are vertical sections on line VII—VII, Fig. 1, drawn to a different scale and showing consecutively the edge bending operations. Figs. 10, 11 and 12 are fragmentary vertical transverse sections through the forming horn showing consecutively the operations in bending the blanks. Fig. 12ª is a central vertical longitudinal section through the forming horn (broken). Fig. 13 is a side elevation of the soldering apparatus shown detached. Fig. 14 a vertical section on line XIV—XIV Fig. 13, Fig. 15 a vertical section on line XV—XV Fig. 13. Fig. 16 a vertical section on line XVI—XVI Fig. 13. Fig. 17 an end elevation of Fig. 13. Fig. 18 is a plan of the soldering devices with the horn omitted. Fig. 19 is an enlarged side elevation of the connecting end of the soldering horn. Fig. 20 a vertical section on line XX—XX Fig. 19. Fig. 21 is a part plan, and Fig. 22 a front elevation of the connecting washer shown in Fig. 19. Figs. 23 and 24 are respectively a side elevation and plan of one of the feed dogs connected with the soldering apparatus. Fig. 25 is an enlarged vertical section on line XXV—XXV Fig. 13. Fig. 26 is a vertical longitudinal section and Fig. 27 is a plan of the fluxing device; Fig. 28 is a vertical longitudinal section, and Fig. 29 is a plan of the soldering device. Fig. 30 is an enlarged vertical section through the left hand edge-bending box in Fig. 7. Fig. 31 is an enlarged side elevation, and Fig. 32 is a vertical section through a part of the driving wheel.

Referring to these drawings and particularly to Figs. 1 to 6, 1 represents the main frame of the machine which carries the several working parts thereof and may be of any convenient design and construction. On the front of this frame is mounted the flat table 2, provided with adjustable outwardly flared side guides, 3, on to which the blanks A are fed, having been already cut to the desired size. These blanks are fed under two upwardly curved guard fingers 4, secured above the center of the table, and their outer edges are passed under flat spring plates 5 on either side of the table which are inclined upwardly at their forward ends as shown in Fig. 3 to facilitate the entrance of said blanks. These plates insure the edges of the blanks being kept flat on the table so that they may be fed truly into the edge-bending boxes 6 in advance thereof.

The blanks are carried forward by means of a reciprocating feed slide 7, Figs. 5, 6 and 7, provided with a double row of beveled spring dogs 8 normally protruding above the table and with a pair of fixed dogs 9 at the rear end. Said feed slide works in grooves 10 formed in the table and is operated by a bell crank lever, Figs. 5 and 6, to one arm 11 of which it is connected by a link 12. This lever is fulcrumed to the frame upon a pivot 13 and its other arm 14 is adjustably connected by a bolt 15 to cheeks 16 on a vertically reciprocating slide 17, Figs. 4, 5 and 6, which derives its motion from the crank shaft 18 by the medium of an adustable connecting rod 19.

The slide feeds the blank forward beneath an adjustable loosely mounted plate 20, Figs. 7, 8 and 9, formed with grooves 21 for the dogs 8 to work in, while the respective edges pass into the edge-bending boxes 6 on either side where they are held against the stationary jaw 22 of said boxes by clamps 23. These clamps are hinged on a pivot 24, in the ends of the boxes in such a manner that they tend to fall inwards when released; and they are raised against the stationary jaw 22 by a horizontal bar 25 connected by adjustable bolts 26 to a block 27 sliding vertically in guides 28 and pivotally hinged at 29, Figs. 5 and 6, to one arm 30 of a bell crank lever pivotally mounted, as at 31, to a link 32 fulcrumed at 33 to the frame. The other arm 34 of the lever is in engagement with a cam 35 on the crank shaft 18.

In order to relieve the weight of the block 27 when stationary it is supported on springs 130 seated on lateral lugs projecting from the frame as in Figs. 2, 5 and 6.

Referring particularly to Figs. 7, 8 and 9, the outer edges 36 of the right hand clamp 23 and the left hand jaw 22 are beveled as shown and around the same the edges of the blank are bent to form the interlocking hooks shown in Fig. 9. This operation is performed by a lever 37 shown in said figures, which illustrate respectively the successive movements of said lever and the other parts of this mechanism.

It will be noticed that the parts of the edge-bending mechanism are similar on either side, but arranged somewhat differently on account of one edge being bent up while the other is turned down. The description will therefore be given of the right hand side mechanism only.

The operating lever 37 is hinged at its lower end to an approximately horizontal adjustable rod 38 pivotally connected at 39 to one end 40 of a bell-crank lever pivoted to a lug on the frame 1 at 41, the other end 42 of said bell-crank lever being pivotally connected to an adjustable connecting rod 43 attached to a vertical slide plate 44, Figs. 2, 3 and 4, working in side guides 45. On said plate is a roller 46 engaging a box-shaped cam 47 on the crank axle or shaft 18.

The foregoing mechanism rocks the lever 37 which is pivotally mounted at its other end at 48 inside the box 6 to a link 49 journaled on the pivot 24 and said link has a shoulder 50 against which the protruding ends of a more or less sharp edged bar 51 fixed in the lever 37 is adapted to abut. The upper outer end 52 of the lever 37 is rounded and works against a projecting bearing block 53 on the inside face of the box during the first movement of the edge-bending mechanism.

The more or less sharp edged bar 51 is situated above the edge of the blank when the same enters the box and on the movement of the lever 37 in the direction shown by arrows, Figs. 7 and 8, the edge of said bar bends the edge down until said bar engages the shoulder 50 on the link 49 which moves to the left or inwards (as shown in Fig. 9) carrying the bar 51 with it and so bends the edge of the blank around the beveled edge 36 of the clamp 23, thus forming one of the interlocking hooks 54. After this operation the lever 37 returns and the bar 25 descends thus allowing the clamps 23 to fall inwards slightly so that the distance between the beveled edges 36 is decreased thus preventing the blank A from being retarded in its next progressive movement.

It will be noticed that on the left hand side the beveled edge is formed on the jaw of the box and that the link 49 is journaled on a separate pivot 24ª mounted in the left hand edge-bending box above the pivot 24. The dogs 8 on the slide which had previously returned under the blank now advance against the rear end and push the same over the forming horn 55 employed for bending the blank into a cylindrical shape and shown particularly in Figs. 3, 4, 10, 11 and 12.

The blank is guided on its side edges by flanged guides 56 secured to the frame and its forward edge is brought into alinement by spring adjustment stops 57 pivotally mounted on the frame, Figs. 3 and 4. The horn is secured to the upper end of the reciprocating block 27 by a bolt 58 passing through its central rigid part 66. By the operation of this block the horn is raised a little and with it the blank until same jams in the center against the anvil 59 which is rigidly mounted on the frame and extends over the horn as shown also in Figs. 5 and 6.

The forming wings 60 are curved in a semi-cylindrical shape and pivotally hinged at 61 to the anvil 59, each being connected by links 62 to rocking levers 63 pivoted at 64, Figs. 2 and 4, to the frame. Adjustable rods 65 connect these levers to the aforementioned slide plates 44. When the rocking levers 63 are operated (Figs. 10 and 11) they cause the forming wings 60 to descend so that their ends engage the flat blank A and gradually bend the same around the expansible forming horn, the diameter of which is at this time less than the finished can-body.

One important feature of this part of the mechanism is that the right hand wing, Fig. 10, descends before the other so that the bent edges of the blank will overlap. This is achieved by the arrangement of the operating faces of the cams 47 on the crank shaft.

The next operation is to interlock the bent or hooked edges 54 and this is performed by the expansion of the horn after the forming wings 60 have started to ascend again as shown in Fig. 12. Accordingly said forming horn is formed in three pieces, one rigid central wedge-shaped part 66 aforementioned and two curved wings 67 loosely hinged in sockets 68 on either side of said wedge-shaped part and at the upper end thereof. Through the lower end of this latter part (see Fig. 12ª) a longitudinal rocking shaft 69 is journaled on one end of which is secured a double cam 70 formed with rounded ends.

On the inside of the loose wings and at the lower end thereof are adjustable studs 71 with rounded noses which extend inwardly through a lateral horizontal hole 72 in the central part 66 and normally rest against the sides of the cam 70. Secured to the other end of the rocking shaft is a pinion 73 provided with a few teeth and adapted to be partially rotated by a vertically reciprocating rack 74 on the end of the slide 17; thus when said rack ascends it causes the ends of the cam 70 to partially rotate and engage the studs 71 on the wings and thrust same out, thereby expanding the horn and consequently the can body to the size of the finished article so that the hooked edges 54 engage and tightly interlock as shown in Fig. 12.

In order to provide for the closing in of the wings, the rock shaft has a coiled spring 131 around it exerting a pressure against that of the rack so that when the latter recedes said rock shaft partially rotates and with it the cam until the end tooth of the pinion 73 abuts against a stop 132 thus insuring that said pinion will be in its correct position for the next upward movement of the rack.

It will be noticed that the wings 67 are so hinged that when the cam 70 is freed from the studs 71 said wings normally fall inwards as shown in Fig. 10. The interlocked edges are then compressed between the central part 66 of the horn and a hammer or bumper 75, (Figs. 4, 5, 6 and 12) extending forwardly from the upper end of the slide 17, said central part being provided with a longitudinal recess 76 so that the seam formed by the junction of the edges will be on the interior periphery of the can-body.

.It will be obvious that the seam may be formed on the exterior periphery of the can-body by forming the recess 76 in the hammer.

The jointed can-body B has now to be ejected from the forming horn and this is performed by two horizontal ejector rods 77 extending forwardly from the feed slide 7, Fig. 6, and which reciprocate in guide ways 78 formed in the upper part of the horn, Figs. 10, 11 and 12.

Just prior to the discharge of the can body B the horn is lowered a little by the movement of the slide 27 so that the edge of the body extends across the path of the ejector rods 77, hence the next forward movement of the latter ejects the body from the forming horn.

If it is desired to make an air tight joint the bodies are discharged from the forming horn 55 on to a soldering horn 79 having connected therewith the devices for fluxing, applying the solder, sweating same, and removing the superfluous solder, all of which are situated beneath said horn and shown in Figs. 13 to 25.

The soldering horn comprises four angle irons 80, Fig. 20, screwed to distance pieces 81 situated between same at regular intervals and the edges of said angle irons conform to the internal periphery of the can bodies B.

At the rear end of the horn are two vertical ribs 82, Figs. 19, 20 and 21, adapted to fit corresponding guides 83 formed on a connecting washer 84 attached by the bolt 58 to the forming horn 55. By this arrangement said forming horn may move vertically without affecting the soldering horn and the latter is maintained in true alinement and prevented from turning, while it furthermore constitutes a joint between the horns by which they may be readily detached.

The soldering horn is supported at each end upon a pair of rollers 85, 85, Figs. 13, 14 and 18 inclined inwardly at the top and mounted loosely upon brackets 86 on base plates 87, 88, adjustably supported on the angle iron bed 89. The base plate 87 supports a fluxing pan 90, Figs. 13 and 18, in which is submerged a metal roller 91 mounted on a bent lever 92 one end of which is pivoted as at 93 and the other suspended by a spring 94. Another roller 95 covered with an absorbing elastic material, such as felt or flannel, is mounted on a pair of swivel arms 96 and rests upon the roller 91 thus when the can body is ejected from the forming horn it passes over the roller 95, rotates the same, and fluxes the seam.

The bodies are now carried forward intermittingly by dogs 97 on reciprocating feed bars 98 on each side of the horn as shown in several of the figures. These bars are formed of angle iron and are supported on grooved rollers 99, Figs. 13, 14 and 17, loosely mounted on the base plates 87 and 88—the horizontal flanges of said bars rest on the rollers while the vertical flanges engage the grooves thereof as shown. Said bars are connected together by adjustable straps 100, Figs. 15 and 17, which pass over the horn, and to one strap a connecting rod 101, Figs. 13 and 18, is attached and connected at its other end to a crank-pin 102 on the drive wheel 103, Fig. 3, by which the bars are reciprocated. Along said bars at regular intervals are pivotally mounted horizontal spring operated dogs 97, Figs. 23 and 24, which engage the bodies at the rear and intermittingly feed them forward over the soldering rollers, etc.

In order to prevent the bodies from being acciden-tally dragged backwards, vertical check dogs 104, Fig. 20, are provided each of which is pivotally mounted in slots 105 formed in the upper end of the distance pieces 81 and over-balanced in such a manner that after the body has depressed its forward end and passed over, said end again rises and prevents any retrogression of the body.

The feed dogs carry the bodies along the horn and between same and the rollers 85 and pass them over the device for applying the solder, Figs. 13, 18 and 25. This comprises a number of hollow rollers 106 each having a slightly concave periphery and a spindle 107 loosely mounted within a pair of slotted bars 108 extending longitudinally of the adjustable solder bath 109. These rollers being hollow are buoyant and are only partly submerged in the solder and thus have an upward pressure on the seam of the body so that the friction created produces an independent rotation of each of said rollers and so insures a thorough application of solder to the seam. The bodies are then carried forward to the sweating device employed for sweating the solder well into the seam, Fig. 16. This comprises a longitudinal bar 110 of metal screwed to an adjustable hollow casting 111 in which is a gas supply pipe 112 provided with jets for heating said sweating bar. The can bodies are then passed over a revolving brush 113, Figs. 13, 17 and 18, employed for removing any superfluous solder therefrom, said brush being journaled in bearings on the base plate 88 and provided with a grooved pulley 114 driven in any suitable manner. The last pair of feed dogs then finally ejects the soldered can body off the end of the soldering horn.

Throughout this machine the various parts are provided with means for adjustment so that can-bodies of varying sizes may be formed in the same machine.

The whole of the mechanism is operated by the cams and cranks on the main shaft 18 on which is mounted a continuously rotating drive wheel 103 connected and disconnected from the shaft by means of a clutch mechanism. This clutch mechanism is clearly shown in Figs. 31 and 32, and comprises a spring controlled dog 115 seated in a recess formed in a collar 116 fixed on the shaft 18, said dog being normally pressed out of the recess by its spring into the path of a lug 117, Fig. 31, on the inner periphery of a recessed boss 118 of the drive wheel. The shaft is disengaged from the drive wheel by pressing the dog 115 back into the recess of the collar 116 and out of the path of the lug 117, so that the wheel will rotate without moving the shaft. The depression of the dog is accomplished by means of a bell-crank lever pivoted on the frame at 119, Fig. 1, the arm 120 of said lever being brought under the dog by moving the lever to the right, from the position shown in Fig. 1. This movement is effected by swinging the arm 121 on its pivot 119 towards the shaft 18 and said arm 121 is provided with a stirrup 122 to receive the foot of the operator. The arm 120 is locked in engagement with the dog by means of a beveled stop 123, Figs. 2 and 3, which is automatically raised in front of the arm 121 after it passes the stop by a spring controlled pedal 124, on which the stop is mounted; the pedal being pivoted at 125 on the frame and resiliently held in its raised position by a spring 126.

To couple the shaft with the drive wheel, the pedal 124 is depressed carrying the stop from in front of the arm 121 which latter may now be swung on its pivot away from the shaft 18, carrying the arm 120 from engagement with the spring dog and permit said dog by the action of its spring to move in front of the lug 117 and be engaged thereby locking the wheel and shaft together.

Having now particularly described and ascertained the nature of my said invention and in what manner the same is to be performed I declare that what I claim is:—

1. In a machine such as described, the combination with the edge-bending boxes and clamping means for the blank; of links pivoted at one end in the boxes and having shoulders, levers pivoted in the other ends of said links, edge-bending bars mounted on the levers to seat in said notches, and mechanism to actuate the levers, whereby said bars will first be rotated to bend the edges of the blank which protrude into the boxes and then be moved bodily toward the blank to bend the edges inward.

2. In a machine such as described, the combination with a pair of oppositely situated edge-bending boxes, each having a depending clamping jaw and an oppositely situated bearing face; of a movable jaw pivoted to each box to rotate toward the center of the blank, a link having a shoulder pivoted in each box, a lever having an upper rounded end pivoted to said link, an edge-bending bar mounted on the lever and capable of seating on the shoulder, mechanism to operate the levers and means to actuate the pivoted clamping jaws, the said rounded end of the lever first rotating while bearing against the bearing face and then moved bodily toward the blank when the bar has seated on the shoulder of the link.

3. In a machine such as described, the combination with the stationary jaws; of oppositely situated pivoted jaws capable of rotating toward the center of the blank, a bar to lift the pivoted jaws to clamp the blank between them and the fixed jaws and means for raising and lowering the bar.

4. In a machine such as described, the combination with the stationary jaws; of oppositely situated pivoted jaws capable of rotating toward the center of the blank, a bar to lift the movable jaws to clamp the blank between them and the fixed jaws, reciprocating means to raise and lower the bar, and devices to adjust said bar relatively to said means.

5. In a machine such as described, the combination with the stationary jaws; of oppositely situated movable jaws, means to simultaneously adjust a stationary and the corresponding movable jaw for different widths of blanks, a bar to move the movable jaws and means to adjust the height of the bar.

6. In a machine such as described, the combination with an anvil; of a sliding block, a forming horn mounted thereon comprising a wedge-shaped central rigid part having recesses, curved wings hinged to the upper end of the rigid part, adjustable lugs in the wings to take into said recesses and means mounted in the rigid part to engage the lugs to spread the wings.

7. In a machine such as described, a forming horn comprising a central rigid wedge-shaped part having lateral and longitudinal recesses, curved wings hinged to the upper end of the wedge-shaped part, adjustable studs mounted in the wings to take into the lateral recesses, a rock-shaft mounted in the longitudinal recess, a double cam on the rock-shaft engaging the studs, a reciprocable hammer coöperating with the rigid portion and means on the hammer to actuate the rock-shaft.

8. In a machine such as described, a forming horn comprising a central, rigid wedge-shaped part having two lateral recesses and a longitudinal recess, a curved wing hinged on each side and to the upper portion of the wedge-shaped part, adjustable studs on the wings taking into the recesses, a spring-retracted rock-shaft mounted in the longitudinal recess, means to limit the rotation of the shaft, a double cam on the shaft to engage the lugs, a pinion on the shaft, a reciprocable hammer coöperating with the wedge-shaped part and a rack mounted on the hammer to engage the pinion to rotate the shaft and spread the wings.

9. In a machine such as described, the combination with a vertically reciprocable forming horn; of a horizontally reciprocating feed slide and ejector rods on the forward end of the slide and mechanism to reciprocate the horn and move it into position to permit the slides to engage the end of the can body on the horn.

10. In a machine such as described, the combination with a vertically reciprocating forming horn having a rigid central portion and expansible lateral wings having guide-ways therein; of a horizontally reciprocable feed slide and ejector rods on the forward end of the slide movable in the guide ways and mechanism to reciprocate the horn to bring the guideways in alinement with the ejector rods and to permit the rods to act on the end of the can body on the horn.

11. In a machine such as described, the combination with a crank shaft; of a vertically reciprocable slide connected thereto, a hammer mounted on the slide; a bell-crank lever fulcrumed on the frame of the machine, a feed slide connected to the upper end of said lever and means to connect the other end thereof to the slide to operate the feed-slide on the downward movement of the hammer.

12. In a machine such as described, the combination with the frame, a driving shaft and a cam thereon; of a reciprocating block mounted in the frame, a forming horn mounted on the block, a bell-crank lever, a loose link connecting the bell-crank lever to the frame, one arm of said lever connected to the block and the other arm operated by the cam, and a horizontal bar mounted on the block, substantially as described.

13. In a machine such as described, the combination with a stationary soldering horn; of a vertically reciprocating forming horn, a connecting washer on the end of the forming horn, guides on the washers and corresponding ribs on the soldering horn.

14. In a machine such as described, the combination with means for horizontally feeding a flat blank, including an ejector device, edge-bending mechanism, means to clamp the blank during the operation of the edge-bending mechanism, a forming horn and mechanism coöperating therewith to form the can body; of a soldering horn across the end of which the forming horn moves, and means to progress the can body along the horn.

15. In a machine such as described, means for horizontally feeding flat blanks, including an ejector device, edge-bending and clamping mechanism, a vertically reciprocable forming horn and mechanism to form the can body, all constituting the can-body-forming machine, in combination with a stationary soldering horn, a sliding connection between the two horns, said ejector mechanism ejecting the can body from the forming horn onto the soldering horn when the former is in register therewith, and means driven from a rotating part of the machine to progress the can body along the soldering horn, for the purposes set forth.

16. In a can-body forming machine, means for fluxing the seam, comprising a fluxing pan, a metal roller submerged in the flux therein, a lever pivoted at one end and spring-held at the other on which said roller is mounted, a second roller resting on the metal roller and a pair of swivel arms in which the second roller is mounted, substantially as and for the purpose set forth.

In testimony whereof I have hereunto set my hand in presence of two subscribing witnesses.

GEORGE GARDNER.

Witnesses:
EDWARD N. WATERS,
WALTER C. HART.